(12) United States Patent
Landry, Jr.

(10) Patent No.: US 6,857,624 B2
(45) Date of Patent: Feb. 22, 2005

(54) TUNABLE SPRING RATE AND ENERGY STORAGE SPRING BODY

(75) Inventor: Joseph Raymond Landry, Jr., Douchequet, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 17 days.

(21) Appl. No.: 10/305,600

(22) Filed: Nov. 27, 2002

(65) Prior Publication Data

US 2004/0100008 A1 May 27, 2004

(51) Int. Cl.[7] .................................................. F16F 1/36
(52) U.S. Cl. ....................................... 267/153; 267/141
(58) Field of Search .............................. 267/153, 141, 267/141.2–141.7, 257, 258, 152, 242, 140

(56) References Cited

U.S. PATENT DOCUMENTS

| | | | |
|---|---|---|---|
| 68,143 A | 8/1867 | Allyn | |
| 98,540 A | 1/1870 | Alden | |
| 126,794 A | 5/1872 | Fields | |
| 168,845 A | 10/1875 | Pratt | |
| 170,590 A | 11/1875 | Pratt | |
| 1,936,389 A | * 11/1933 | Hallquist | 267/153 |
| 2,443,201 A | 6/1948 | Bluyter | 267/1 |
| 2,958,526 A | 11/1960 | Ulderup et al. | 267/63 |
| 3,037,764 A | 6/1962 | Paulsen | 267/63 |
| 3,263,985 A | * 8/1966 | Planta | 267/153 |
| 3,368,806 A | 2/1968 | Szonn | 267/1 |
| 3,633,856 A | * 1/1972 | Crews | 267/141 |
| 3,687,440 A | 8/1972 | Jarret et al. | 267/141 |
| 3,957,127 A | * 5/1976 | Bouchard et al. | 267/141 |
| 4,139,246 A | * 2/1979 | Mikoshiba et al. | 267/141.3 |
| 4,591,030 A | 5/1986 | Antkowiak | 188/268 |
| 4,958,812 A | * 9/1990 | Wolf et al. | 267/294 |
| RE33,696 E | 9/1991 | Stevenson | 267/33 |
| 5,160,121 A | * 11/1992 | Bartholomew | 267/136 |
| 5,190,269 A | 3/1993 | Ikeda et al. | 267/140.12 |
| 5,330,165 A | 7/1994 | Van Goubergen | 267/141 |
| 5,518,227 A | 5/1996 | Whelan | 267/153 |
| 5,957,441 A | 9/1999 | Tews | 267/153 |
| 6,126,136 A | 10/2000 | Yen et al. | 248/560 |
| 6,220,585 B1 | 4/2001 | Heron | 267/153 |
| 6,443,437 B1 | 9/2002 | Beyene et al. | 267/64.26 |

FOREIGN PATENT DOCUMENTS

| | | | | |
|---|---|---|---|---|
| DE | 1642886 | 8/1952 | | F16F/1/44 |
| DE | 2400176 | 7/1975 | | F16F/1/37 |
| DE | 19529129 | 2/1997 | | F16F/1/36 |
| EP | 0886078 | 12/1998 | | F16F/7/08 |
| FR | 1087744 | 2/1955 | | |
| GB | 322338 | 12/1929 | | |
| JP | 10231874 | 9/1998 | | F16F/1/38 |

* cited by examiner

Primary Examiner—Matthew C. Graham
(74) Attorney, Agent, or Firm—Nancy T. Krawczyk

(57) ABSTRACT

The present invention is a spring, comprising a support structure and a substantially straight walled, solid elastomeric column. The support structure has a continuous and selectively vented support wall and a base wherein the support wall has different minimum and maximum inside diameters. The elastomeric column has a diameter less than, equal to, or slightly larger than the minimum diameter of the support structure wall and a height greater than the height of the support structure.

10 Claims, 3 Drawing Sheets

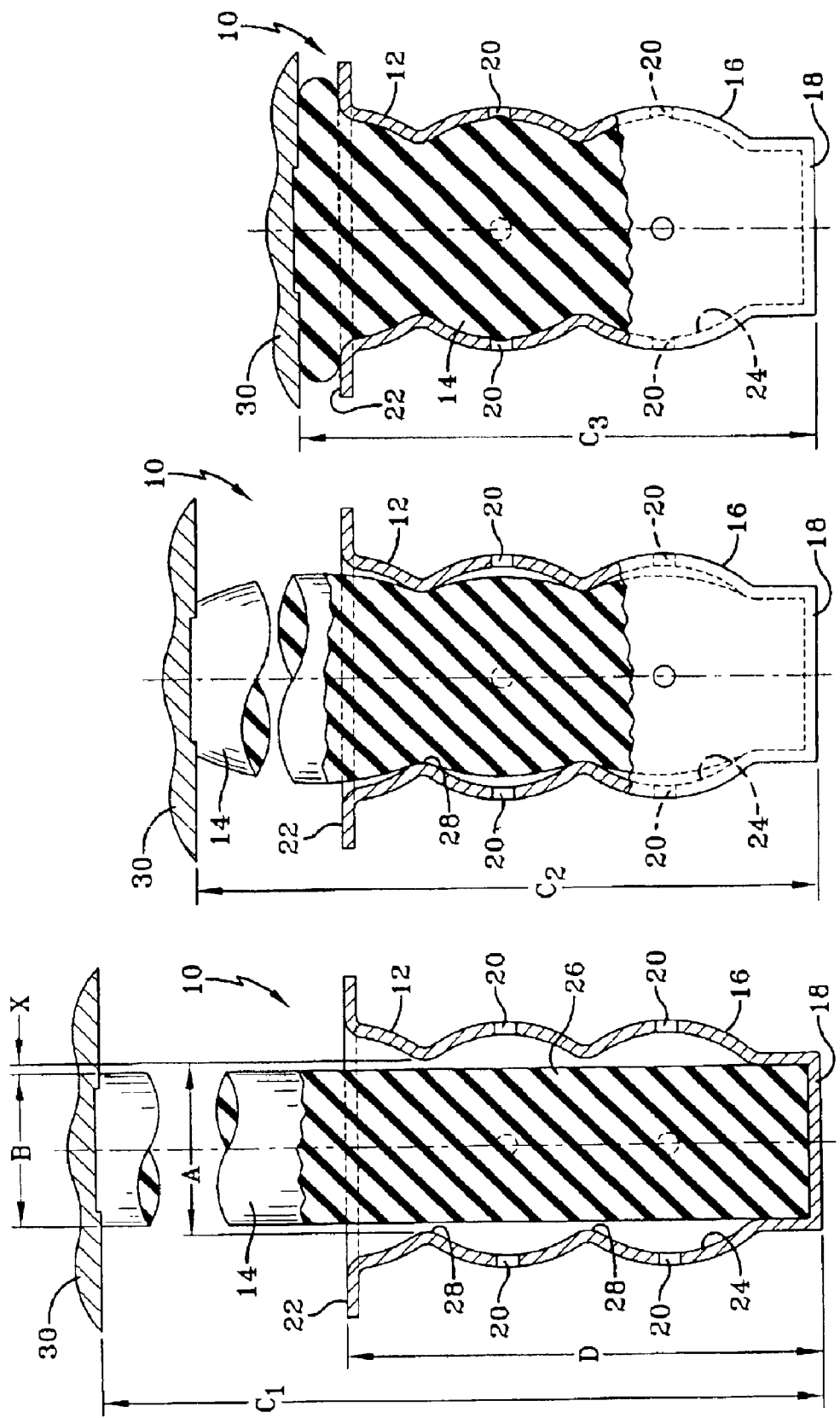

TUNABLE SPRING RATE AND ENERGY STORAGE SPRING BODY

FIELD OF THE INVENTION

The present invention is directed toward a rubber spring. More specifically, the present invention is directed toward a tunable rubber spring having a centrally located rubber column and a rigid outer support structure.

BACKGROUND OF THE INVENTION

Although the concept is obscure outside the discipline of structurally confined rubber spring design, and limited in understanding within the discipline, general applications of such rubber springs have been attempted in the past. Usually, the outer structure is hollow cylindrical, and an inefficient use of at least the lower regions of the internally located rubber results. The springs are not very spring rate tunable when the wall has a purely cylindrical configuration, and the rubber has undefined or unstable coefficient(s) of friction with the support wall, as increased interfacing occurs.

Additionally, durability is a problem, due to abrasion at the contact stick and slip surfaces between the outside of the rubber spring and the inside of the support structure. Other prior art, regarding column stability, teaches locating a hole in the cylindrical rubber spring column, and inserting a structural post whose height does not exceed the maximum deflected height of the spring. This gives column stability, but is not as efficient, nor as durable, as the presently disclosed invention, and is non-tunable.

Examples of such springs are illustrated by U.S. Pat. Nos. 3,262,985 and 3,037,764.

SUMMARY OF THE INVENTION

The present invention is directed to a compression spring body that has a compact geometry for high volumetric efficiency, yet will accommodate high displacement, high energy storage and long life in compression spring applications.

The present invention is a spring comprising a support structure and a straight walled, solid elastomeric column. The support structure has a continuous and vented support wall and a base wherein the support wall has different minimum and maximum inside diameters. The elastomeric column has a diameter less than, equal to, or slightly larger than the minimum diameter of the support structure wall and a height greater than the height of the support structure.

In another aspect of the invention, the elastomeric column is positioned with the support structure so that the central axis of the elastomeric column and the support structure are aligned, with the elastomer extending beyond both open ends of the structure.

In another aspect of the invention, the elastomeric column of the spring has a height greater than twice the diameter of the column. The height of the column may be up to eight times the diameter of the column and even greater depending upon the desired spring characteristics and application contact conditions.

In another aspect of the invention, the column is fixedly secured to the base of the support structure. The column may be fixedly secured to the support structure by either adhesively securing the column to the base of the support structure or by compression fitment between the column and the support structure.

In another aspect of the present invention, the support structure walls have a configuration set from among the group of bellows, repeating bellows, helical twists, hourglass, repeating hourglass. The outside surface of the support structure wall is either a mirror image, or a structurally complimentary configuration of the inside wall, which when combined are adequate to support the stresses imposed by the sliding and compressive rubber impingement on said inner wall.

In another aspect of the invention, either the outer surface of the elastomeric column and/or the inside surface of the support structure are coated with a reduced friction coating to yield low friction surfaces. Alternatively, the elastomeric material forming the column may contain a friction reducing material to produce a self-lubricating reduced friction surface to the column.

BRIEF DESCRIPTION OF THE DRAWINGS

The invention will be described by way of example and with reference to the accompanying drawings in which:

FIG. 1a is a cross-sectional view of the spring body under no compression;

FIG. 1b is a cross-sectional view of the spring body under partial load displacement;

FIG. 1c is a cross-sectional view of the spring body under maximum load displacement;

DETAILED DESCRIPTION OF THE INVENTION

Figure 3B:
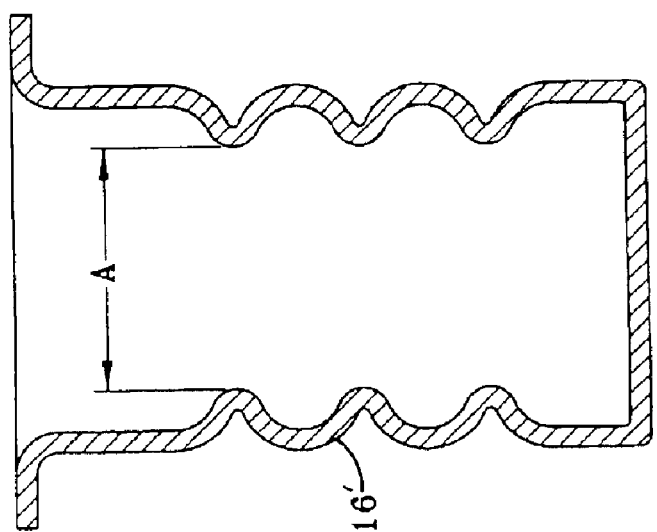
FIGS. 3a and 3b are alternative cross-sectional views of the structure of FIG. 2.

With reference now to the drawings, and in particular to FIGS. 1a to 1c, a compression spring embodying the principles and concepts of the present invention will be described.

Within the spring element and structure system, the spring 10 has a rigid tubular support structure 12 and a solid rubber column 14. The support structure 12 is constructed from a rigid material such as metal, fiber reinforced thermoplastics, fiber glass molding compounds, and other similar metallic or non-metallic materials. The strength and durability of the structural component of the system-should be sufficient to withstand the environment into which the spring 10 will be employed, and withstand the forces to which the spring will be subjected during operation. The strength and durability should be adequately defined in a finite element or other equivalent analysis of the material, as prescribed at the limits of load, deflection, and cyclical life estimates, and factors of safety. At a minimum, the material should have tensile strength of 100 MPa, and have a flex strength of at least 200 MPa. The structure 12 may be produced in a number of economical ways, including, but not limited to, hydroforming and spinning in the metal composed variant. The structure 12 has a wall 16 and a base 18. To reduce or eliminate the entrapment of air, during loading, or creation of a vacuum, during unloading, between the structure 12 and the column 14, the structure 12 has strategically positioned vent holes 20.

Figure 3A:
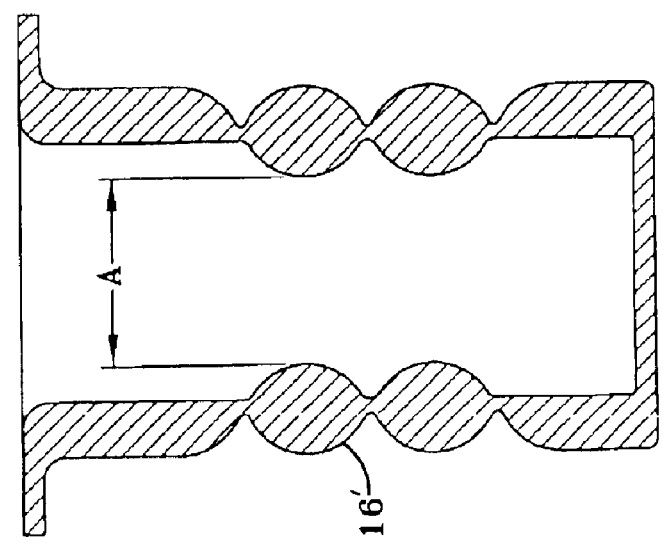
Figure 2:
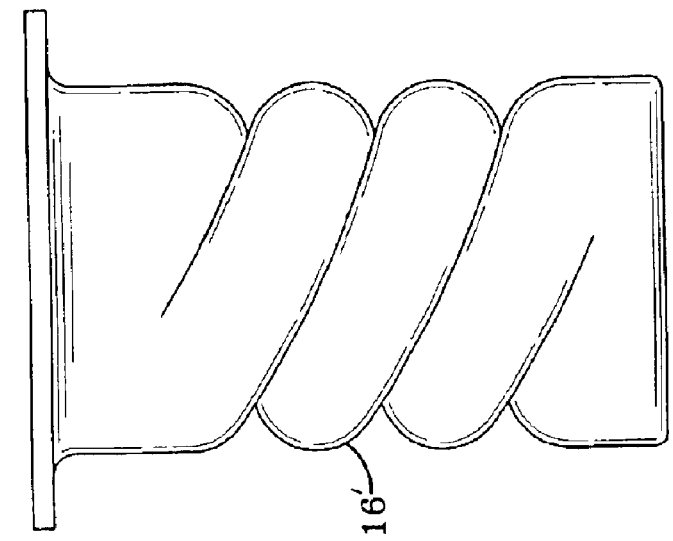
FIG. 2 is an alternative construction for the outer rigid support structure.

The wall 16 has a bellows-type configuration, preferably terminating in an upper lip 22. The structure 12 is illustrated with two bellow sections, creating an inside minimum diameter A. The wall 16 can have any type of wave-like, or non-straight, configuration having differing minimum and maximum inside diameters. Another wall configuration is illustrated in FIG. 2. The walls 16' have a helical configuration. The inside surface 24 of the wall 16' can be either a mirror image, see FIG. 3a, or a complimentary configuration, see FIG. 3b. By varying the wall configuration and inside surface configuration, the spring 10 can be tuned for specific applications. The structure 12 can also have a simple hourglass configuration.

The structure 12, and the accompanying column 14 as discussed below, are illustrated as having an overall circular configuration. However, depending on the required performance requirements for the spring 10, the structure 12 and the column 14, they may have a non-circular configuration, such as elliptical, requiring appropriate rotational alignment of the two components 12, 14 about the compression axis, prior to compressive load application, in order to optimize performance.

Set inside the structure 12 is the straight walled, solid rubber column 14. The column 14 is set within the structure 12 so that the central axis of the structure 12 and the column 14 are aligned, but not necessarily coincident. The outer surface 26 corresponds in configuration to the configuration of the minimum diameter A of the structure 12 and, in this embodiment, has a diameter B less than the minimum diameter A. In other words, for the illustrated circular structure 12, the column 14 is a smooth walled circular column, and if the structure 12 has an overall oval configuration, the column 14 would have an oval configuration. Thus, prior to compression and when the axis of the column 14 and the structure 12 are coincident, a loosely defined constant distance x is maintained between the structure minimum diameter A and the column diameter B, in its minimum size configuration. The spring rate of column 14 in the radial direction is significantly lower than the compression spring rate, such that the distance x, in any radial direction, may vary prior to any compression load application.

The column 14 is preferably securely fixed within the structure 12 at the base, in the preferred embodiment, so that, prior to compression or assembly in a larger system, the components 12, 14 do not inadvertently separate. The column 12 may be secured by compression fit at the base 18, as illustrated, or it may be bonded, adhesively secured, or attached by the use of any other securing means known as applicable between the two types of materials used for the structure 12 and the column 14. If the securing means limits the compression and expansion capability of the column 14, only the lowermost portion of the column 14 should be so limited.

The column 14 has an uncompressed height, C1, greater than the height D of the structure 12. The height C1 is also relative to the maximum diameter B, and is at least twice the diameter B, thus the column has a height to diameter ratio of at least 2:1. The column has a preferred height to diameter ratio of 2:1 to 8:1; however, unique applications requiring high displacements or deflections may have column height to diameter ratios greater than 8:1. The top of the column 14 may be secured to a connection structure 30 through which a compressive load is applied to the spring 10; FIGS. 1a–1c show such a secured configuration achieved by compression fit, but which may be achieved in any conventional manner similar to those possible for securing the base 18.

The column 14 is formed from rubber. The rubber has the following properties: compression modulus range of 150 to 1500 psi, bulk or volumetric modulus range of 120,000 to 240,000 psi and a tensile strength of 1,500 to 4,000 psi. In the preferred embodiments, damping or energy absorption properties are not a significant characteristic affecting the performance of the spring 10. Examples of suitable rubbers include, but are not limited to, natural rubber, polybutadiene, chloroprene, nitrite, butyl, styrene butadiene, silicone, and combinations of any of the these rubbers, some of which would provide useful damping and energy absorption.

A friction reducing material such as a PTFE impregnated coating may be applied to the inside surface 24 of the structure 12 or the outer surface 26 of the column 14. Alternatively, a friction reducing material may be incorporated into the rubber of the column 14, resulting in a self-lubricating interface between structure 12 and column 14.

For the system of FIG. 1a, prior to compression, the rubber column 14 has a height C1 at least three times greater than the diameter B of the column 14, and greater than the height D of the structure 12. Except at the base of the spring 10 where the column 14 is held into the structure 12 by compression fit or by other means, the rubber column 14, in the smallest diameter configuration, is distanced from the inside diameter A of the structure 12 by a distance x.

As a load is applied to the top of the column 14, as seen in FIG. 1b, the rubber column 14 begins to compress and buckle or bend, with initial contact being made between the outer surface 26 of the column 14 and the minimum diameter locations 28 on the inside of the structure 12. Thereafter, in all embodiments, the rubber column 14, between the minimum diameter locations 28, begins to bulge toward the remainder of the structure 12. As the load continues to be applied to the spring 10, the contact surface area between the structure 12 and the column 14 increases.

At full compression, see FIG. 1c, full contact is made between the outer surface 26 of the column 14 and the inside surface 24 of the structure 12. The portion of the column 14 that is not contained within the structure 12 rests on the lip 22, providing an additional cushioning effect.

Figure 4:
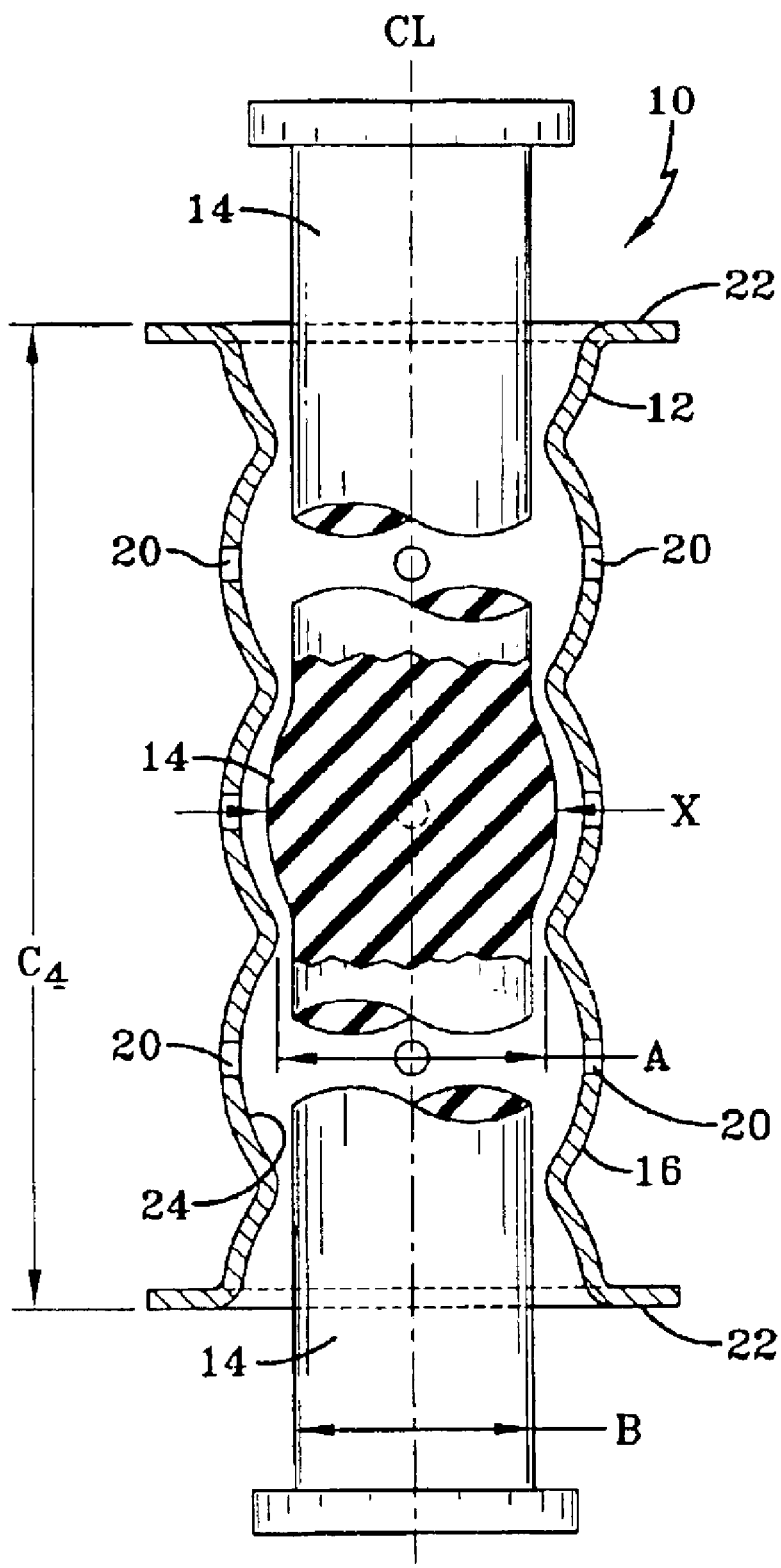
FIG. 4 is a cross-sectional view of another embodiment of the invention.

FIG. 4 illustrates an alternative embodiment of the invention, with aspects that are also applicable to previously discussed embodiments. In the illustrated spring 32, the structure 34 is open at both ends and is shown with a bellows type configuration, having a minimum inner diameter A. The rubber column 36 has a substantially constant diameter B, with a single portion 38 having an increased diameter X such that the diameter X is at least 1.1 times the diameter A. The maximum dimension of X is, of course, the maximum inside diameter of the structure 34. The presence of the portion 38 is twofold: it permits some tunability of the spring 32 and permits the use of a rubber column 36 that is not previously secured at either end to a fixed structure. As with the previous embodiment, the column 36 has a height greater than height $C_4$ of the structure 34.

All of the variations already disclosed as permissible with the spring 10 are applicable herein for the spring 32.

To assemble the spring 32, the rubber column 36 may be pushed in or pulled into the structure 34. In either method, once the increased diameter portion 38 has passed the first minimum diameter location 40 of the structure 34, the column 36 snaps into place in the structure 34. When a load is applied to the spring, the column 36 responds similarly to column 14; gradually making contact with the inner surface of the structure 34 with structure 34 supporting the buckling and bending of the column 36 until full contact along the inside of the structure 34 is achieved.

For each particular application wherein the spring 10 or 32 is to be used, the spring 10 or 32 is designed using a finite element analysis and using appropriate rubber materials characterization properties, or alternatively, other lesser or equivalent predictive methodologies, which indicate the change in outside rubber surface shape and size versus displacement or deflection. Thus, in designing a spring for a particular application, the contact profile and rate of increased surface contact can be predicted.

The efficient utilization of all the rubber volume, above the base connection, is what essentially allows for the greater displacements and energy storage capability within the relatively tall and narrow, or small foot print, spring geometry.

The spring assembly may be used in applications having both static and dynamic compressive (and, when specifically allowed, intermittent dynamic tensile) loads and displacements, such as encountered in shock and vibration isolator applications, or energy storage and recovery devices. Two assemblies may also be used in a compressively preloaded condition, with the central axes aligned with each other and the compression directions 180 degrees opposed to each other, providing additive beneficial energy storage capacity. The above described novel spring assemblies can be used in any parallel axes and some multiple orientation, non-parallel axes groupings, increasing the load capacity and spring rate of a system, and improving the multi-directional performance of systems containing such assemblies.

Conventionally, a solid rubber cylinder having a height to diameter ratio of 3:1 or greater would be unstable in compression. Upon application of a compressive force or load, the cylinder would attempt to buckle. However, with the disclosed spring, the cylinder is increasingly supported by the interior walls of the rigid structure. As the compressive force increases, the load contact surface of the cylinder continues to deflect in the direction of shortening the height of the column and increasing the outside diameter of the cylinder. Thus, after initial contact of the sides of the cylinder and the structure, the surface area of rubber-to-structure contact increases, eventually making near full or full perimeter contact. As this occurs, and because of the material properties of rubber, where the compression modulus is significantly lower than the bulk or "volumetric" modulus, the spring rate increases significantly, while at the same time, the below described novel structural support geometry allows greater column stable deflection than otherwise possible in an equivalent or shorter unsupported rubber spring.

Full utilization of all of the volume of rubber above the base connection, over the entire displacement range, is realized in a compact cross-sectional area, thus reducing the undesirable high strain density concentrations, when compared to less fully utilized designs. Likewise, average regional strains are reduced, for a given displacement versus size, when compared to prior unconstrained or circumferentially constrained designs. Prior art rubber springs, having rubber bulge surface contacts, have "dead spots" or volumetric sections of rubber that are not contributing to the performance of the product in any meaningful way. Because of the combined lower peak and lower average strain versus displacement phenomena contained in the novel concept, displacement or stroke capacity is increased and durability and life are extended.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A spring comprising a rigid tubular support structure and a solid elastomeric column, the support structure having a continuous support wall, the support wall having differing minimum and a maximum inside diameters, and along a majority of its length, the elastomeric column having a diameter less than the minimum diameter of the support structure wall and a height greater than the height of the support structure.

2. A spring as set forth in claim 1 wherein the elastomeric column is positioned with the support structure so that the central axis of the elastomeric column and the support structure are aligned.

3. A spring as set forth in claim 1 wherein the elastomeric column has a height greater than twice the diameter of the column.

4. A spring as set forth in claim 1 wherein the structure has a base and the column is fixedly secured to the base of the support structure.

5. A spring as set forth in claim 4 wherein the column is fixedly secured to the support structure by either adhesively securing the column to the base of the support structure or by compression fitment between the column and the support structure.

6. A spring as set forth in claim 1 wherein the support structure walls have a configuration set from among the group of bellows, repeating bellows, helical twists, hourglass, repeating hourglass.

7. A spring as set forth in claim 1 wherein the outside surface of the support structure wall is either a mirror image or a structurally complimentary configuration of the inside wall surface.

8. A spring as set forth in claim 1 wherein the outer surface of the elastomeric column, the inside surface of the support structure, or both are coated with a reduced friction coating.

9. A spring as set forth in claim 1 wherein the elastomeric material forming the column contains a friction reducing material.

10. A spring as set forth in claim 1 wherein the structure has two open ends, and the column extends beyond the open ends of the structure and has a portion of increased diameter wherein the increased diameter is greater than the minimum diameter of the support structure wall.

* * * * *